(12) United States Patent
Karaca et al.

(10) Patent No.: US 12,164,571 B2
(45) Date of Patent: *Dec. 10, 2024

(54) PRE-EMPTIVE GRAPH SEARCH FOR GUIDED NATURAL LANGUAGE INTERACTIONS WITH CONNECTED DATA SYSTEMS

(71) Applicant: Neo4j Sweden AB, San Mateo, CA (US)

(72) Inventors: Irfan Nuri Karaca, London (GB); Alistair Philip Campbell Jones, London (GB); James Webber, Guildford (GB)

(73) Assignee: Neo4j Sweden AB, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,382

(22) Filed: Sep. 8, 2022

(65) Prior Publication Data

US 2023/0014700 A1 Jan. 19, 2023

Related U.S. Application Data

(63) Continuation of application No. 16/667,675, filed on Oct. 29, 2019, now Pat. No. 11,475,065.

(51) Int. Cl.
*G06F 16/30* (2019.01)
*G06F 16/901* (2019.01)
*G06F 16/9032* (2019.01)

(52) U.S. Cl.
CPC .... *G06F 16/90328* (2019.01); *G06F 16/9024* (2019.01); *G06F 16/90332* (2019.01)

(58) Field of Classification Search
None
See application file for complete search history.

(56) References Cited

U.S. PATENT DOCUMENTS

| | | | |
|---|---|---|---|
| 7,152,031 B1 | 12/2006 | Jensen | |
| 8,234,582 B1 | 7/2012 | Haynes | |
| 8,904,272 B2 | 12/2014 | Harrington | |
| 9,910,931 B2* | 3/2018 | Guerrero | G06F 3/0237 |
| 10,002,159 B2* | 6/2018 | Kuriakose | G06F 16/24522 |
| 10,042,921 B2 | 8/2018 | Boguraev | |
| 10,528,870 B2* | 1/2020 | Lindsley | G06F 16/90335 |
| 10,733,619 B1 | 8/2020 | Newman | |
| 10,860,655 B2* | 12/2020 | Murphey | G06F 16/90335 |
| 10,915,821 B2 | 2/2021 | Spackman | |
| 11,074,250 B2* | 7/2021 | Flaks | G06F 16/367 |
| 2005/0283466 A1* | 12/2005 | Dettinger | G06F 16/2425 |

(Continued)

*Primary Examiner* — Polina G Peach
(74) *Attorney, Agent, or Firm* — Van Pelt, Yi & James LLP

(57) ABSTRACT

Techniques are disclosed to provide guided natural language interactions with a connected data system, such as a graph database. In various embodiments, natural language input associated with a graph database query associated with a graph data set is received. The natural language input is processed to generate a set of candidate strings. At least a subset of the candidate strings is mapped to an entity in the graph data set. The entity and data comprising the graph data are used set to determine a candidate graph pattern associated with the graph database query. The candidate graph pattern is used to guide a user associated with the natural language input to refine the graph database query.

20 Claims, 9 Drawing Sheets

(56) References Cited

U.S. PATENT DOCUMENTS

| | | |
|---|---|---|
| 2009/0024962 A1 | 1/2009 | Gotz |
| 2009/0083261 A1 | 3/2009 | Nagano |
| 2009/0164441 A1 | 6/2009 | Cheyer |
| 2010/0161646 A1* | 6/2010 | Ceballos ............. G06F 16/2428 707/769 |
| 2011/0282892 A1 | 11/2011 | Castellani |
| 2013/0262501 A1 | 10/2013 | Kuchmann-Beauger |
| 2014/0074888 A1* | 3/2014 | Potter ................. G06F 16/2423 707/779 |
| 2014/0149376 A1 | 5/2014 | Kutaragi |
| 2014/0172914 A1 | 6/2014 | Elnikety |
| 2014/0244687 A1 | 8/2014 | Shmueli |
| 2014/0280068 A1 | 9/2014 | Dhoopar |
| 2015/0026145 A1 | 1/2015 | Prakash |
| 2015/0127677 A1 | 5/2015 | Wang |
| 2015/0161291 A1 | 6/2015 | Gur |
| 2016/0042069 A1* | 2/2016 | Lee-Goldman ........ G06Q 50/00 707/706 |
| 2016/0203237 A1* | 7/2016 | Whitnah ............. G06F 16/9024 707/722 |
| 2016/0275196 A1 | 9/2016 | Lee |
| 2017/0371965 A1 | 12/2017 | Davar |
| 2018/0032930 A1* | 2/2018 | Kolb ..................... G06F 40/253 |
| 2018/0052885 A1 | 2/2018 | Gaskill |
| 2018/0121500 A1 | 5/2018 | Reschke |
| 2018/0329958 A1 | 11/2018 | Choudhury |
| 2018/0357282 A1* | 12/2018 | Ambartsumov .. G06F 16/90335 |
| 2018/0373753 A1* | 12/2018 | Flaks .................... G06F 16/245 |
| 2019/0057145 A1 | 2/2019 | Huang |
| 2019/0212879 A1* | 7/2019 | Anand .................. G06Q 50/10 |
| 2019/0272296 A1* | 9/2019 | Prakash ................ G06F 16/243 |
| 2019/0278777 A1* | 9/2019 | Malik ................. G06F 16/9024 |
| 2019/0384863 A1 | 12/2019 | Sirin |
| 2020/0050605 A1 | 2/2020 | Tung |
| 2020/0301916 A1* | 9/2020 | Nguyen ............. G06F 16/3344 |
| 2020/0334234 A1* | 10/2020 | Mendel-Gleason ......................... G06F 16/9024 |
| 2020/0349129 A1* | 11/2020 | Bracholdt ......... G06F 16/24578 |
| 2021/0165831 A1* | 6/2021 | Noda .................... G06F 16/355 |
| 2021/0357585 A1 | 11/2021 | Surdeanu |

\* cited by examiner

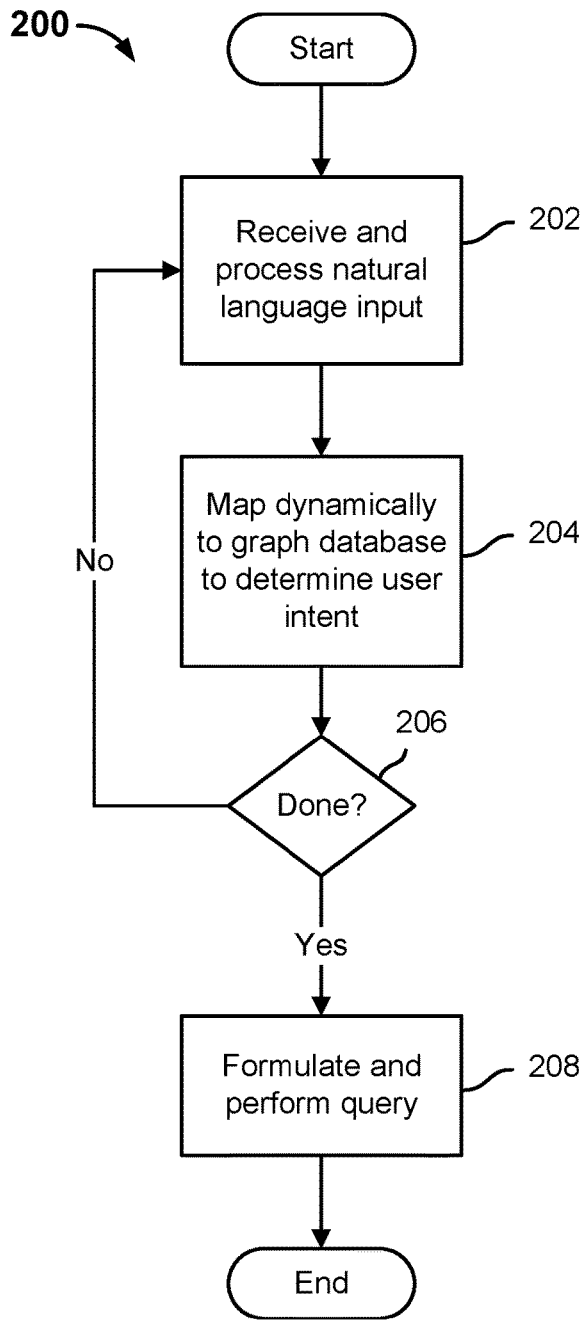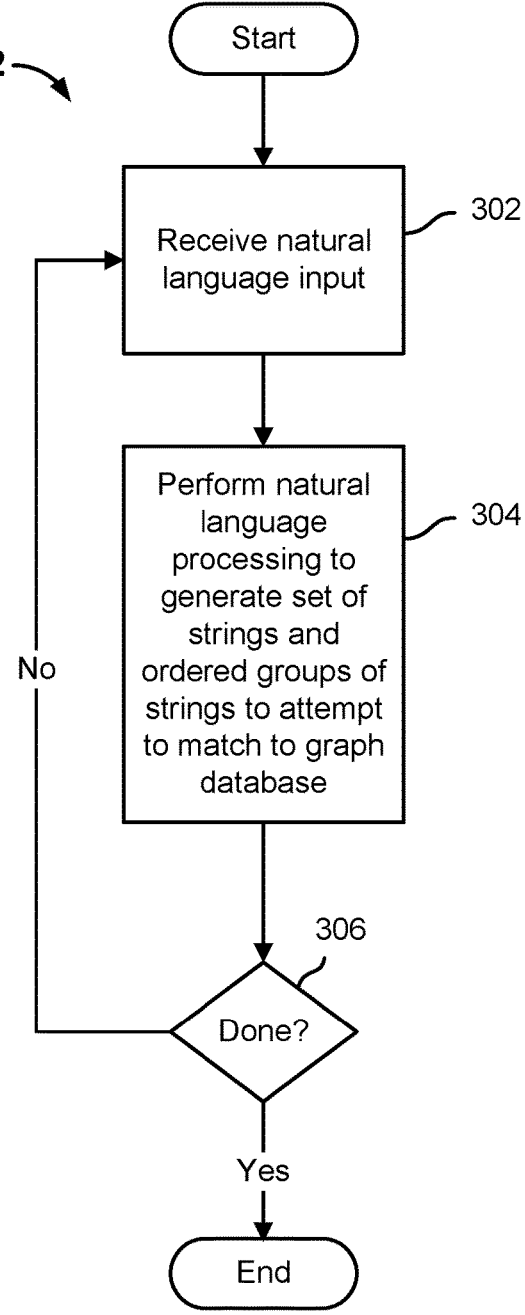
FIG. 2
FIG. 3

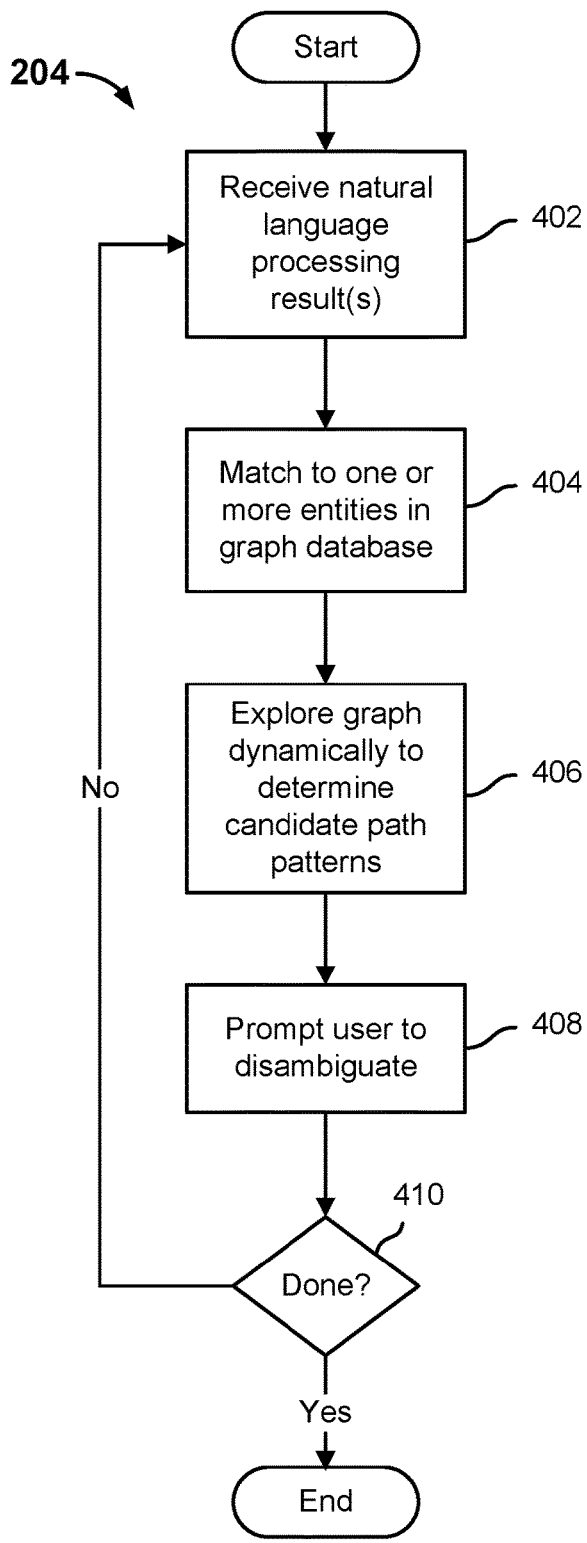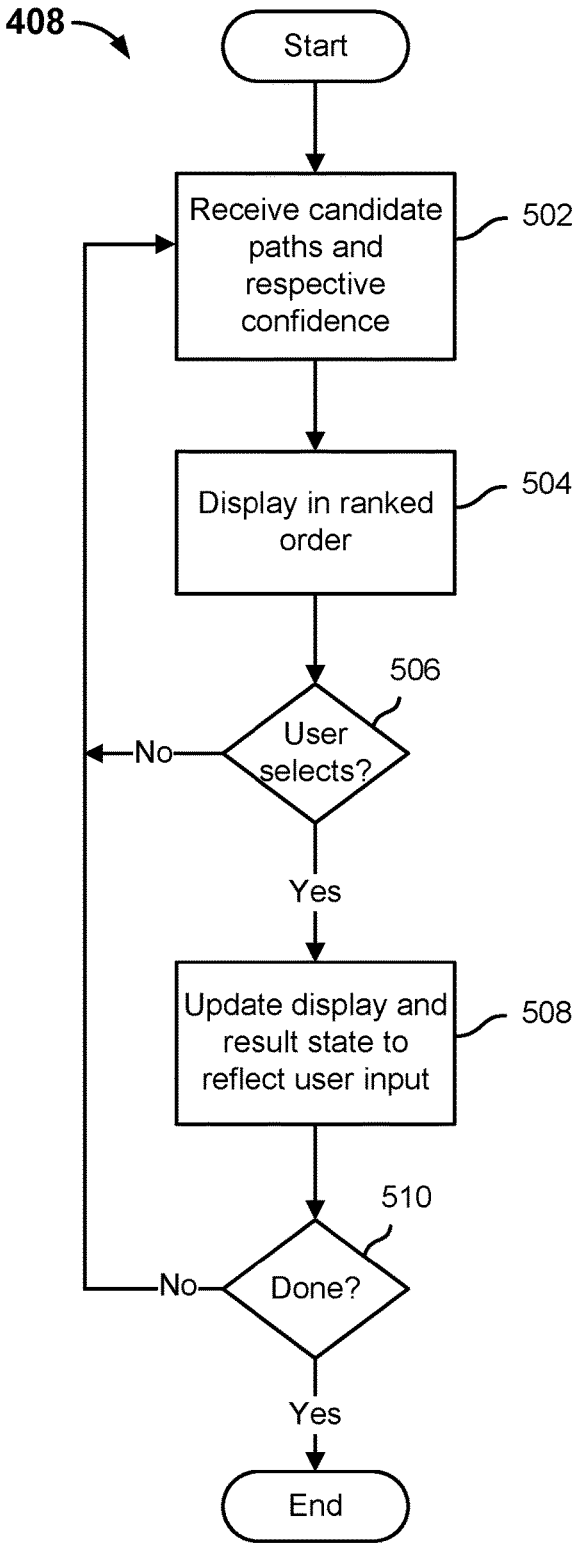
FIG. 4
FIG. 5

US 12,164,571 B2

PRE-EMPTIVE GRAPH SEARCH FOR GUIDED NATURAL LANGUAGE INTERACTIONS WITH CONNECTED DATA SYSTEMS

CROSS REFERENCE TO OTHER APPLICATIONS

This application is a continuation of U.S. patent application Ser. No. 16/667,675, entitled PRE-EMPTIVE GRAPH SEARCH FOR GUIDED NATURAL LANGUAGE INTERACTIONS WITH CONNECTED DATA SYSTEMS filed Oct. 29, 2019 which is incorporated herein by reference for all purposes.

BACKGROUND OF THE INVENTION

A graph database is a computerized record management system that uses a network structure with nodes, edges, labels, and properties to represent data. A node may represent an entity such as a person, a business, an organization, or an account. Each node has zero or more labels that declare its role(s) in the network, for example as a customer or a product. Nodes have zero or more properties which contain user data. For example, if a node represents a person, the properties associated with that node may be the person's first name, last name, and age. Relationships connect nodes to create high fidelity data models. Relationships are directed, have a type which indicates their purpose and may also have associated property data (such as weightings).

Graph databases have various applications. For example, a graph database may be used in healthcare management, retail recommendations, transport, power grids, integrated circuit design, fraud prevention, and social platforms, to name a few.

Despite their ease-of-use for technical users, exploring graphs to gain insight into the data is somewhat difficult for non-technical users. While several useful data visualization patterns are known for graphs, the act of guiding a user towards producing such a useful visualization of their graph data has not been well addressed.

BRIEF DESCRIPTION OF THE DRAWINGS

Various embodiments of the invention are disclosed in the following detailed description and the accompanying drawings.

FIG. 2 is a flow diagram illustrating an embodiment of a process to provide guided natural language interactions with a connected data system.

FIG. 3 is a flow diagram illustrating an embodiment of a process to process natural language input to provide guided natural language interactions with a connected data system.

FIG. 4 is a flow diagram illustrating an embodiment of a process to map processed natural language input to graph database entities and paths to provide guided natural language interactions with a connected data system.

FIG. 5 is a flow diagram illustrating an embodiment of a process to disambiguate a result of processing natural language input to provide guided natural language interactions with a connected data system.

DETAILED DESCRIPTION

Figure 1:
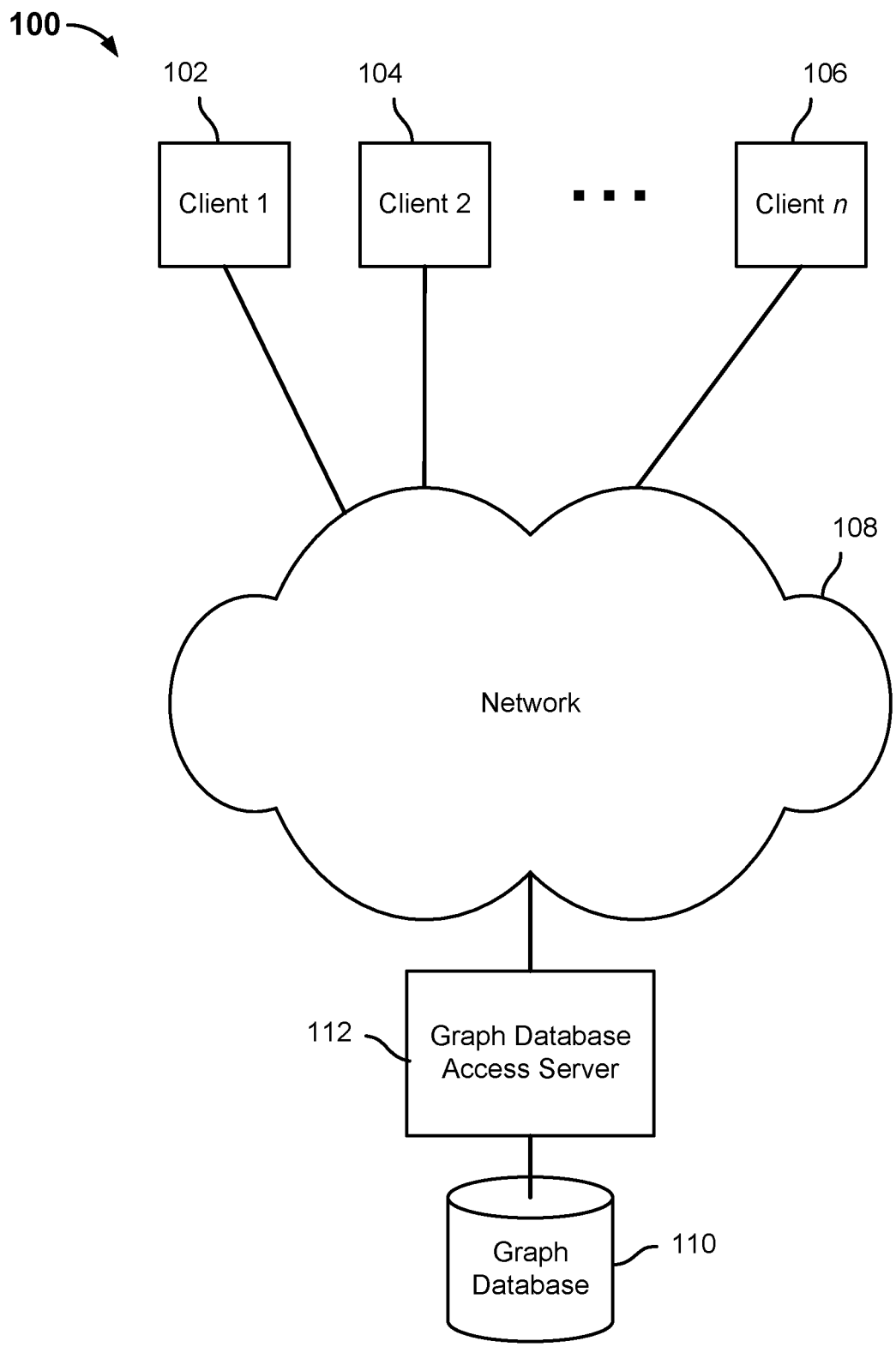
FIG. 1 is a block diagram illustrating an embodiment of a system to provide guided natural language interactions with a connected data system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to guide non-technical users when interacting with a labeled property graph database. In various embodiments, a system as disclosed herein contextually prompts a non-technical user in navigating a connected data towards an information goal. In various embodiments, the underlying graph structure and metadata are combined with free text and stem-match searches such that a user typing natural language is interactively prompted to enrich their natural language queries. As a result, non-technical users can achieve the same information goals as a technical user armed with a full graph query language.

In various embodiments, users are guided visually and textually to gain insight from graph data using a familiar natural language interface. The interface uses various kinds of metadata and data from the underlying graph to offer prompts and suggestions to guide the user towards a target informational goal and corresponding visualization. The queries towards which the user is guided in some embodiments ultimately are equivalent to those that would be written by technical experts in native graph database query language, as the prompting and guidance offered by the system enriches the natural language with context from the underlying graph.

Graph database management systems store interconnected data as a network of data entities. The connections between the entities create paths through the network, and such paths encode higher-order information into the data: how the data relates, groups, propagates, and evolves. That path information provides useful insight.

Technical users have the ability to explore paths using a graph database query language or programmatic API. The syntax and grammar of the Cypher graph database query language, for example, is accessible for a technical user, since its grammar is similar to that of an actual graph.

Non-technical users typically lack the training and experience to use highly technical tools, such as a graph database query language or a programmatic API, to explore data and relationships in a graph database. In various embodiments, techniques disclosed herein overcome this problem by enabling non-technical users (who are often domain experts) to execute equivalent queries without having to lean query languages or programmatic APIs. The user specifies their query in natural language and a system as disclosed herein prompts them appropriately to "restore" their natural language search context to the same level as a technical user's equivalent graph database query expressed in Cypher or another graph database query language that has graph-like syntax.

In various embodiments, a punctuation-less path pattern may be used to express search path-oriented patterns over the graph in a user-friendly manner. In various embodiments, a punctuation-less path pattern as disclosed herein may include the plain text labels of a pattern that includes one or more nodes and relationships that exist in the graph data set, expressed without graph query language punctuation and other formalisms, such as uppercase or capitalization. Consider a simple example, such as a social graph which graph database includes a plurality of "Person" nodes any two or which may have a "KNOWS" relationship between them. For two "Person" nodes with a "KNOWS" relationship between them, a punctuation-less path pattern as disclosed herein may be as follows: "person knows person". A non-technical user may readily and intuitively express a query in such terms, or nearly so. By contrast, a corresponding query expressed in the Cypher graph database query language would be: (:Person)-[KNOWS]-(:Person).

In the above example, For example a single node in the graph database which represents a person is mapped to query syntax as (Person) which is read as a node labelled "person". The equivalent punctuation-less path pattern is the more easily read "person". Similarly, a node representing a person which is connected via a KNOWS relationship to another node representing a person is expressed as the syntactically complex (:Person)-[:KNOWS]→(:Person). There is a great deal of context in this statement which a graph database uses to query the graph structure efficiently: there are two nodes representing persons and there is a semantic connection between them explicitly that one person knows the other, but which is not reciprocated (e.g. a fan who knows a celebrity). The punctuation-less path pattern equivalent is the more prosaic person knows person. The same reduction of syntactic complexity applies as the paths get longer and more complex.

In various embodiments, use of techniques disclosed herein obviates the need for non-technical users to understand complex database query language syntax and grammar. In various embodiments, all the syntax composed from punctuation and all the conventions encoded in casings are removed, leaving only words and spaces. However, punctuation, operators, and casings are important ways of conveying information in a property graph database context. They identify and disambiguate the user's intent to the graph database management system. In various embodiments, the user is prompted to identify and disambiguate concepts in a guided fashion as they explore the graph of their data. The system restores path pattern context incrementally as the user explores paths of interest. In various embodiments, the system is able to restore the context of the original path patterns even when they have been entered as punctuation-less path patterns, for example by non-technical domain experts. In various embodiments, the simplified language used by the user to form punctuation-less path patterns is ultimately equivalent to the syntactically more complex Cypher (or other graph database query language or API having graph-like syntax) query that a technical user would write.

FIG. 1 is a block diagram illustrating an embodiment of a system to provide guided natural language interactions with a connected data system. In the example shown, system 100 includes a plurality of client systems/devices, represented in FIG. 1 by client systems 102, 104, and 106. In various embodiments, clients 102, 104, and 106 communicate via network 108 (e.g., the Internet) with a graph database access server 112 configured to provide access to a graph database system 110.

In various embodiments, graph database access server 112 uses techniques disclosed herein to provide guided natural language interactions with a connected data system. For example, in some embodiments, graph database access server 112 includes a visualization layer and a module configured to apply a set of natural language processing and guidance algorithms to natural language input (e.g., text, spoken natural language query, etc.) in the context of a given graph data set to provide guided natural language interactions with graph database 110. In some alternative embodiments, parsing and natural language processing as described above are performed by client side code, such as a client application associated with the database 110, to provide guided natural language interactions with graph database 110 as disclosed herein. In some such embodiments, the client code sends Cypher queries to access server 112 to obtain metadata and/or data as needed to provide guided natural language interactions with graph database 110.

In some embodiments a natural language query entered at a client system, such as client systems 102, 104, and 106, is communicated via network 108 to graph database access server 112. Graph database access server 112 parses and performs natural language processing on the input to generate a set of strings, keywords, stems, etc. available to be matched to entities and/or path elements that have meaning in the context of the graph data set. For example, the input "person" or the input "people" may be mapped to a "Person" tag or category in the graph data set. Similarly, the text "knows" may be mapped to a "KNOWS" relationship element, and so on.

In some alternative embodiments, client side code processes natural language input as described above and queries the access server 112 and/or database 110 to obtain metadata and/or data as needed to provide guided natural language interactions with graph database 110 as disclosed herein.

In various embodiments, stem matching may be used to map text to an entity in the graph data set. For example, in the context of a movie database the input "director" may be mapped to a "DIRECTED" or "DIRECTED_BY" relationship, since "director" and "directed" share the common stem "direct".

In various embodiments, partially entered or complete user input may be mapped to naming conventions (entities, relationships, etc.) in a graph data set at least in part using one or more indexes of the graph data set. For example, an index may be used to map the input "Tom Hanks" to a Person node with a name attribute value of "Tom Hanks".

In some embodiments, graph database access server 112 provides via network 108 to the client system 102, 104, 106 at which the natural language query is being entered, or in alternative embodiments client side code at client systems such as 102, 104, 106 provides, an interactive graphical user interface to guide the user to refine the user's query based on the results of processing by and/or based on information obtained from graph database access server 112. For example, client side code and/or graph database access server 112 may generate a set of one or more candidate graph data set patterns derived from the user input to that point. For example, initial input by the user may be mapped to a category of node or a subset of nodes or specific node, and paths that exist in the graph data set that include that node may be present as candidates. In some embodiments, selection of a candidate node via a user interface presented at the client system 102, 104, 106 result in the selected path being used to auto-complete a punctuation-less expression of the path at the client system 102, 104, 106 and to refine the focus of the processing by the client side code and/or at the graph database access server 112 to map the user input to a complete path corresponding to the user's intended search.

In various embodiments, once the user indicates the completed path has been discerned through the iterative/recursive system-guided process disclosed herein, the graph database access server 112 formulates and sends to graph database system 110, directly or via the client system 102, 104, 106 a well-formed graph database query language query corresponded to the user's intent. Graph database system 110 includes elements (e.g., query processors, etc.) that consume and execute the query to return the corresponding results, e.g., to the requesting client system 102, 104, 106.

In various embodiments, one or more of graph database access server 112, graph database system 110, and client code running on the requesting client system 102, 104, 106 provide an interactive visualization and interface of the query results, as in the example shown in FIG. 7J below.

FIG. 2 is a flow diagram illustrating an embodiment of a process to provide guided natural language interactions with a connected data system. In various embodiments, the process 200 is performed by a server or other processing system comprising one or more of a hardware processor, a memory, and a network or other communication interface, such as graph database access server 112 of FIG. 1. In the example shown, natural language input (e.g., text, speech, speech transcribe to text, etc.) is received and processed (202). Processing may include, without limitation, one or more of parsing, stemming, dropping nonce or "stop" words, grouping, synonym expansion, other expansion, automated spelling correction, expanding to include common misspellings or typographical variants, etc. The results of the natural language processing are attempted to be mapped dynamically to terms that exist in the graph database, such as category names, node labels, relationship labels, node or relationship attribute values, etc. (204). If the final/full query has not yet been determined (206), further natural language processing (202) and mapping (204) are performed until the final/full query has been determined (206), at which point the query as expressed in a formal graph database query language is formulated and performed (208), e.g., by submitting the query to a query processing layer or module associated with the graph database.

FIG. 3 is a flow diagram illustrating an embodiment of a process to process natural language input to provide guided natural language interactions with a connected data system. In various embodiments, the process of FIG. 3 is performed to implement step 202 of the process 200 of FIG. 2. In various embodiments, the process of FIG. 3 is performed by a server or other processing system comprising one or more of a hardware processor, a memory, and a network or other communication interface, such as graph database access server 112 of FIG. 1. In the example shown, as natural language input is received (302), e.g., as the user is typing in a query entry field, the input is processed to generate a set of strings (e.g., words, groups of words, partial words, etc.), which will be available to be mapped to terms that exist and having meaning in the graph database. Processing continues until all natural language input has been processed (306).

In various embodiments, stem-matching may be used to map text input to entities in the graph data set. In some embodiments, stem-matching extends the already established concept of stemming in natural language processing where, for example, fishing, fished, and fisher all have the common stem fish.

In various embodiments, the system bilaterally maps between human natural language input and the naming conventions used in a graph database. In some embodiments, the following algorithm is used:

Splitting into words when punctuation encountered. For example, ACTED_IN becomes just ACTED IN.

Splitting into words when case changes encountered. For example, ActedIn becomes just Acted In.

Discarding stop words. For example, ACTED_IN becomes ACTED.

Converting to lower case. For example, ACTED becomes acted.

Generating subsets of the provided words by preserving order, such that each subset will be used in matching process later on. For example, 'Tom Hanks Movies' will produce ['Tom', 'Hanks', 'Movies'], ['Tom Hanks', 'Movies'], ['Tom', 'Hanks Movies'] and ['Tom Hanks Movies'].

Note the above techniques, applied bilaterally to user-provided natural language input, on the one hand, and to labels and other names in the graph database, on the other, enables semantic matches to be identified programmatically. For example, given the natural language input "movies in which Tom Hanks was an actor" the system in various embodiments may apply one or more techniques described above to map "movies" to a node labeled Movies, "Tom Hanks" to a Person node with a name attribute having the value "Tom Hanks", and "actor" to a relationship ACTED_IN or ActedIn. For example, for the latter mapping, the input "actor" may have been stemmed and/or otherwise expanded to include "acted" and other variants, while the relationship labels may have been processed as described above to obtain lowercase acted as a term corresponding to a named entity in the graph database, specifically the relationship ACTED_IN or ActedIn.

FIG. 4 is a flow diagram illustrating an embodiment of a process to map processed natural language input to graph database entities and paths to provide guided natural language interactions with a connected data system. In various embodiments, the process of FIG. 4 is performed to implement step 204 of the process 200 of FIG. 2. In various embodiments, the process of FIG. 4 is performed by a server or other processing system comprising one or more of a hardware processor, a memory, and a network or other communication interface, such as graph database access server 112 of FIG. 1. In the example shown, as natural language processing results are received, e.g., on a rolling basis as further natural language input from the user (voice, text, etc.) is received and processed (402), the system attempts to match the processed natural language text to one or more entities in the graph database (404). For example, text input by the user may be expanded by stemming, finding synonyms, correcting misspellings, grouping in different subgroupings, etc., as described above, to generate a set of candidate strings to be matched to corresponding entities in the database (402). Matching may include searching indexes associated with the data set and/or exploring paths in the data set (404). The graph is explored dynamically to determine candidate path patterns (406). For example, if a node or partial path have been determined (e.g., and confirmed by the user), paths that include path components adjacent or not far removed from the determined partial path may be identified. In various embodiments, a confidence score is determined for each candidate path pattern, e.g., based on queries processed previously, further strings/text entered by the user, specificity of match to the user input, specificity of the candidate path pattern, etc., and candidate path patterns are sorted in a ranked order by score and presented to the user in ranked order. The user is prompted to disambiguate the query as discerned so far (408). For example, candidate path patterns may be displayed via an interactive graphical user interface that enables the user to select a candidate path pattern as corresponding to the user's input and intent. In various embodiments, each candidate path pattern is expressed as a punctuation-less path pattern, as disclosed herein, rather than in fully formed graph database query language. In various embodiments, selection by the user of a displayed candidate path pattern results in that candidate path pattern replacing the user-inputted text in a search/query input field in the user interface.

Natural language processing results are received and processed recursively (402, 404, 406, 408) as described above until the process of FIG. 4 is done (410), e.g., an indication is received from the user that the full query is now reflected in the path pattern as displayed to and selected by the user.

In various embodiments, a system as disclosed herein prompts the user to indicate, restore, confirm, etc. the semantic context of the punctuation-less path patterns. For example, in some embodiments, the system recursively and dynamically explores paths within the graph data set that include an initial node and/or partial path to which the natural language input provided has to that point been mapped.

In some embodiments, path components are categorized in four ways:

1. General nodes: A word that stem-matches a label on a node. For example, the word "person" would match when Person is a label stored in the graph database management system.
2. Specific node: A word that identifies a small number of nodes in an index from the graph database management system for the property that contains such words. For example, in a movie database, names of actors are unique enough (because of domain invariants imposed on that industry). Searching for "Tom Hanks" finds exactly one node in the whole database with the property value "Tom Hanks" where searching for "Tom" would find all actors with first name "Tom".
3. Filtered node: A sequence of at least 2 words such that they form a structure like 'Label-Property Name or 'Label-Property Name-Property Value', where the former matches the cases where property exists in a node with that label and latter is where a node exists with that label and property having the provided value. The provided word is either contained within or fuzzily matches property data within nodes. For example, searching for "Actor with name like Tom" in a movie database would search all nodes with label 'Actor' and property 'name' matching "Tom Hanks" and "Tom Selleck" (at least).
4. General relationship: A word that stem-matches a relationship type. For example, matching on "actor" when ACTED_IN is a relationship type in the database.

If the parts of the search input do not immediately conform to the structure of a path pattern, in various embodiments, the system can complete it by inserting additional node patterns or relationships patterns which come from the underlying graph database.

The following tables lists in the left column path parts to which processed natural language has been mapped and in the right column corresponding completed path patterns (derived from real time exploration of the underlying graph database) that may be suggested to the user:

TABLE 1

Examples of completed path patterns from path parts.

| Path parts | Completed path pattern |
|---|---|
| (:Person) | (:Person) |
| -[:KNOWS]- | ( ) - [:KNOWS] - ( ) |
| (:Person) (:Person) | (:Person) -- (:Person) |
| -[:KNOWS]- (:Person) | ( ) -[:KNOWS]- (:Person) |

For example, if the user enters knows that text would be mapped to a KNOWS relationship in the database. The invention then expands to the path pattern for a bilateral KNOWS relationships between any two nodes.

Similarly, if the user enters knows Alan Turing then the machinery would firstly map knows to a KNOWS relationship and Alan Turing to a node. From there the machinery would expand to a completed path pattern for any node that participates in a KNOWS relationship with the Alan Turing node.

Sometimes natural language input from the user into the machinery is close, but not identical to the order needed for a path pattern. In some cases, the machinery in the invention is able to do some limited reordering of the input to match to a likely path pattern. Specifically the invention uses bidirectional queries such that simple patterns of the node-relationship-node type can be evaluated left to right or right to left.

For example, when a user enters Tom Hanks movies it can also be interpreted as movie Tom Hanks which yields a path pattern (:Movie)—(:Person {name: 'Tom Hanks'}) which matches data in the underlying graph. Similarly, if the user enters directors of Tom Hanks movies the expression is can be evaluated so that directors that are of primary interest rather than Tom Hanks as follows: ( )-[:DIRECTED]-(:Movie)—(:Person{name: 'Tom Hanks'}).

In some embodiments, if there are words in the search input that are not part of any node pattern or relationship pattern, and are not stop words, the search input is not considered to be a punctuation-less path pattern and the machinery does not show a corresponding completed path pattern suggestion to the user.

In some embodiments, suggestions that score well (e.g., with a relatively low number of possible matches in the database) are verified before presented to the user by confirming that such data exists in the database. This step may be advantageous in processing long paths, since each phrase may be matched one by one but the whole pattern may not exist in the underlying database. For example, both the phrases 'Stanley Kubrick' and 'acted in' in 'Stanley Kubrick acted in' user input would be matched individually but if there were no "acted in" relationship from/to Stanley Kubrick this suggestion would eliminated in some embodiments.

Further examples of punctuation-less path pattern context enrichment as provided in various embodiments are shown in the following table:

TABLE 2

Examples of punctuation-less path patterns from with equivalent expressed in Cypher graph database query language.

| Path Pattern | Cypher Query |
| --- | --- |
| Tom Hanks | (:Person { name: 'Tom Hanks' }) |
| Tom Hanks movies | (:Person { name: 'Tom Hanks'})--(:Movie) |
| directors of Tom Hanks movies | ( )-[:DIRECTED]-(:Movie)--(:Person{ name: 'Tom Hanks'})[IK: not implemented yet] |
| Owners of Barclays | ( )-[:OWNS]-(:Company { name: 'Barclays' }) |
| UK Companies | (:Country {name: 'UK' })--(:Company) |
| People who live at addresses of people who own UK Companies | (:Person)-[LIVES_AT]-(:Address)--(:Person)-[OWNS]-(:Company)--(:Country{ name: 'UK' }) |

In Table 2 above, the user input Tom Hanks is mapped via an index to a node (or nodes) in the graph database. That node provides context for the raw input which allows the machinery to construct the path pattern containing a node with a Person label, and the property key name and value Tom Hanks.

Next in Table 2, the user input Tom Hanks movies is decomposed into finding the node that represents Tom Hanks (as above) and stem-matching movies onto the existing Movie label in the graph database. With the two endpoints of the query established, the machinery completes the expression by adding an unconstrained relationship at depth one which matches the structure discovered in the underlying graph database.

The directors of Tom Hanks movies example in Table 2, is a more complex but still handled by the invention. First the text literal Tom Hanks is mapped via an index in the graph database to a Person node with the name Tom Hanks. Then then the input text movies is stem-matched to the node label Movie and a untyped relationship between the Movie and Tom Hanks nodes is inferred from the data in the underlying graph database. The DIRECTED relationship is stem-matched from the literal text directors and connected to Movies by matching it to the same relationships in the underlying graph. Finally, an anonymous node ( ) is added by the invention to the left-hand side of the DIRECTED relationship to complete a syntactically correct pattern that maps onto the underlying graph in full.

The owners of Barclays example in Table 2 is typical of the kinds of corporate governance queries that graph databases readily support. It also highlights how the invention takes a very business meaningful text input and maps it to a search pattern suitable for execution on the database. First the text Barclays is matched to a Company node via an index in the graph database. Then the owners text is stem-matched to the relationship OWNS. Finally, to complete the search pattern, an anonymous node ( ) is added.

Next in Table 2, UK companies is mapped from a punctuation-less path pattern into a search pattern as follows. The text UK is matched via an index in the graph to a node with the label Country. The text companies is stem-matched against the node label :Company. To complete the pattern an untyped, undirected relationship—connects those the two node patterns.

Finally in Table 2, to search for the people who live at addresses of people who own UK companies (as used for example in investigative journalism or forensic accounting), the invention has more work to do, but the process is similar to the above. It fuzzily matches the text people to its singular person and matches that against the Person node label. The text live at is fuzzily-matched to the relationship type in the database LIVES_AT and connected to Person in the search pattern based on the same pattern appearing in the underlying graph database. Addresses is stem-matched to Address and mapped to that label present in the underlying database. It is then connected to the LIVES_AT relationship previously created, guided again by the content of the underlying graph database. The text people is fuzzily matched to Person node labels and it is already known that Person nodes are through LIVE_AT Address nodes and so that relationship pattern is also added, again guided by the underlying graph database. Then, the invention maps UK companies as in the example above before stem-matching the text own and matching it to OWNS relationships in the underlying graph to connect the final element of the syntactically correct search pattern.

In various embodiments, candidate path patterns may be displayed via an interactive graphical user interface. The interface allows the user to select a displayed candidate to indicate to the system that the candidate path pattern conforms to the user's intent. In some embodiments, selection of a candidate path patterns results in a corresponding punctuation-less path pattern expression of the path pattern being auto-filled in the search/query input field in the user interface, as in step 408 of FIG. 4.

FIG. 5 is a flow diagram illustrating an embodiment of a process to disambiguate a result of processing natural language input to provide guided natural language interactions with a connected data system. In various embodiments, the process of FIG. 5 is performed to implement step 408 of the process of FIG. 4. In various embodiments, the process of FIG. 5 is performed by a server or other processing system comprising one or more of a hardware processor, a memory, and a network or other communication interface, such as graph database access server 112 of FIG. 1. In the example shown, candidate path patterns and for each a respective confidence score are received (502). The candidate path patterns are displayed in ranked order (504), e.g., on a client system associated with the query. If the user selects a displayed candidate path pattern (506), the display is updated (e.g., selected path is highlighted, other candidate paths not consistent with selection removed, query input field auto-filled with punctuation-less path pattern expression of selected path, etc.) and the result state is updated to reflect that the selected path has been confirmed as corresponding to the user's intent (508). The process repeats iteratively (502, 504, 506, 508) until done (510), e.g., the user selects a displayed path and indicates the path corresponds to and completes the intended query.

In various embodiments, an evolving, dynamic view of the underlying graph is provided via a displayed user interface as the user enters, refines, and disambiguates a search. As the query is entered and refined, at least the candidate paths comprising the graph are displayed. In various embodiments, once the query has been fully entered/confirmed via the guided process disclosed herein, an interactive user interface that facilitates user exploration of at least the portion of the graph identified by the query is displayed.

In the following examples (FIGS. 6 through 7J), an exploration of an athletics data set is presented, specifically in this example a data set comprising data on athletes, events, teams, etc. that participated in different respective Olympics competitions through the years. The examples illustrate the use of techniques disclosed herein to enrich punctuation-less path pattern context based on iterative and interactive user input, resulting in this example in the rendering of the final query and result in an interactive graphical user interface. In various embodiments, the final query achieved in the example and as disclosed herein is the same as may have been formulated in the first instance by an experienced technical user by entering the same graph database query language shown in FIG. 7J.

Figure 6:
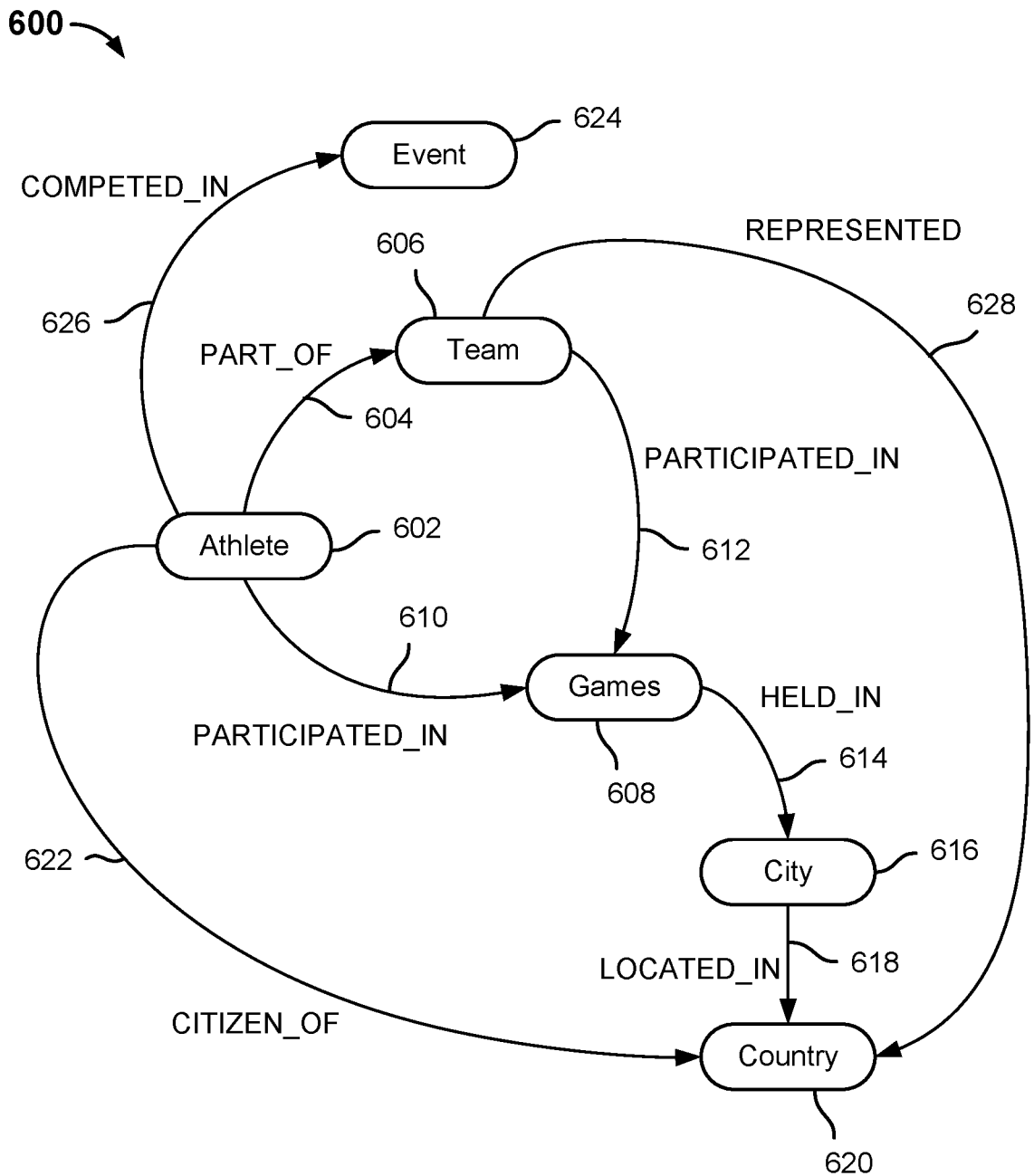
FIG. 6 is a diagram illustrating an example of a portion of the nodes and relationships represented in a graph database.

FIG. 6 is a diagram illustrating an example of a portion of the nodes and relationships represented in a graph database. In the example shown, (partial) graph 600 includes an "Athlete" category (i.e., a node with a type or sub-type label "Athlete") 602. In this example, an Athlete may have a PART_OF relationship to one or more nodes in a Team category 606. A given Athlete or Team may have a PARTICIPATED_IN relationship 610, 612 with one or more nodes in a Games category 608, each instance of which may represent a corresponding Olympic games, such as the London 1948 Olympic games. Each node of the Games category 608 has a HELD_IN relationship 614 to a corresponding City 616, and each City 616 has a LOCATED_IN relationship 618 to a corresponding Country 620. Further, an Athlete 602 may have a CITIZEN_OF relationship 622 with a Country 620 and a COMPETED_IN relationship 626 with one or more Events 624, e.g., the Men's 100 meter hurdles, etc. Finally, in this example a Team 606 may have a REPRESENTED relationship 628 with a Country 620.

The categories and relationships shown in FIG. 6 are included by way of example and represent only a small subset of what may be defined and represented in a graph database.

Figure 7A:
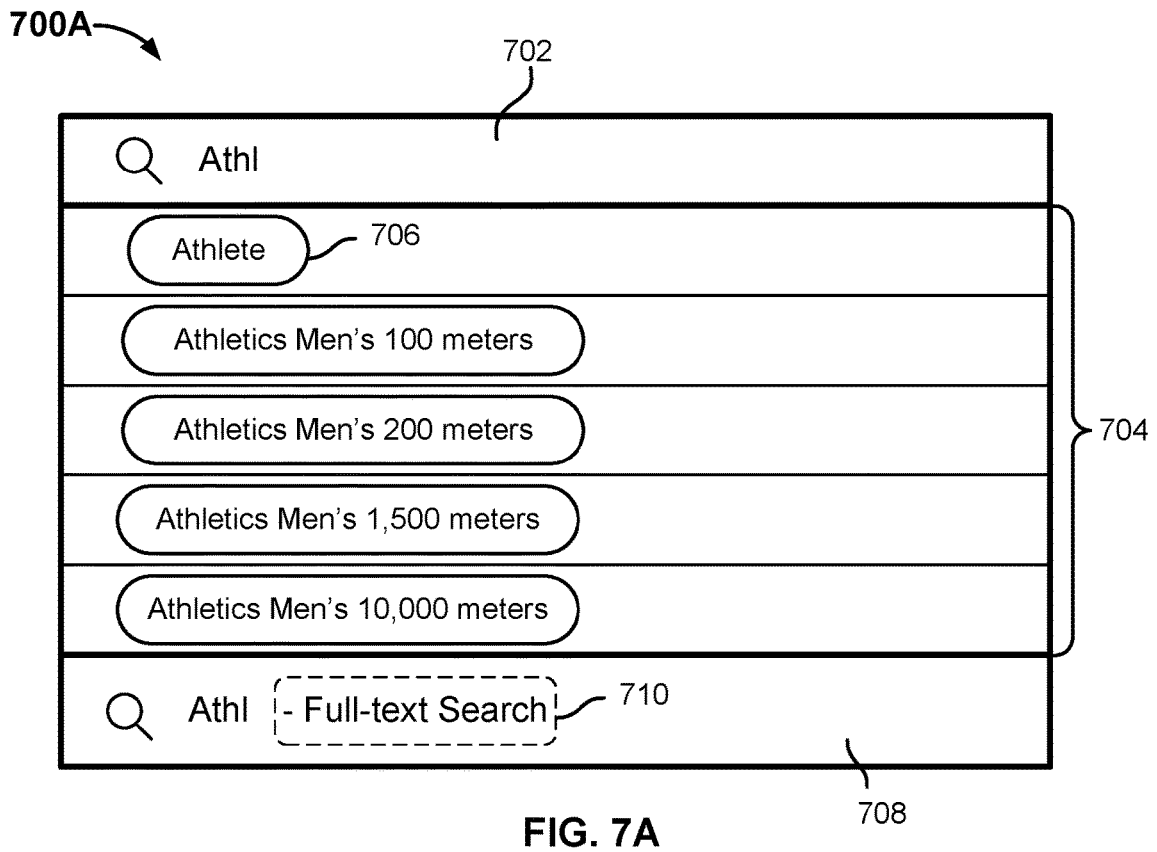
FIG. 7A is a diagram illustrating an example of an interactive user interface provided by an embodiment of a system to provide guided natural language interactions with a connected data system.

FIG. 7A is a diagram illustrating an example of an interactive user interface provided by an embodiment of a system to provide guided natural language interactions with a connected data system. In the state shown, the user is at the start of the user's guided exploration of the graph database. In this example, the user's goal is to find those athletes who were part of a team that participated in the London 1948 Olympics. In some embodiments, not shown in FIG. 7A, the user interface 700A would include a displayed set of categories that exist in the data. Based on the displayed categories, or simply the user's knowledge of the lexicon of the field of interest, in the example and state shown in FIG. 7A the user in the example shown has started typing and has managed to input the string Athl into the search box 702 before the user interface displays the Athlete category 706 (e.g., via stem-matching, index matching, etc.) as well as a collection of data properties in a results display area 704 matched via an index based search. In the example shown, a full text search box 708 displays the text entered by the user in the search box 702 and includes a full text search button 710, which the user can select at any time to perform a full text search, resulting in a full text index being used to find records responsive to the text entered in search box 702. In some alternative embodiments, full text search box 708 and button 710 are omitted.

Figure 7B:
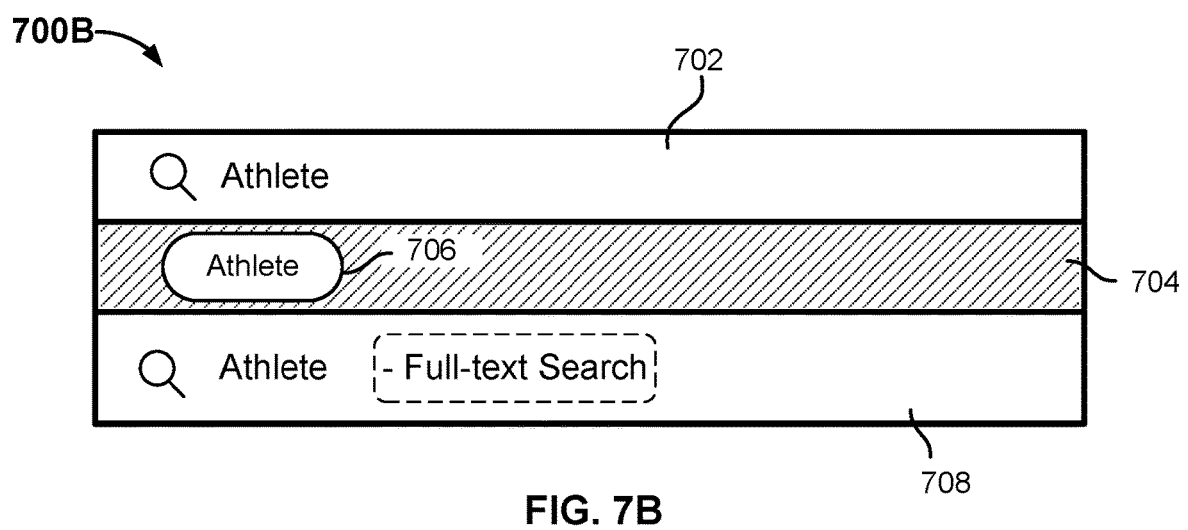
FIG. 7B is a diagram illustrating an example of an interactive user interface provided by an embodiment of a system to provide guided natural language interactions with a connected data system.

FIG. 7B is a diagram illustrating an example of an interactive user interface provided by an embodiment of a system to provide guided natural language interactions with a connected data system. In the example/state 700B shown, the user has selected the Athlete category 706 which results in the first part of the natural language query being auto-completed in search box 702 provides a visual clue in the form of an Athlete category node 706 being displayed in the results 704.

Figure 7C:
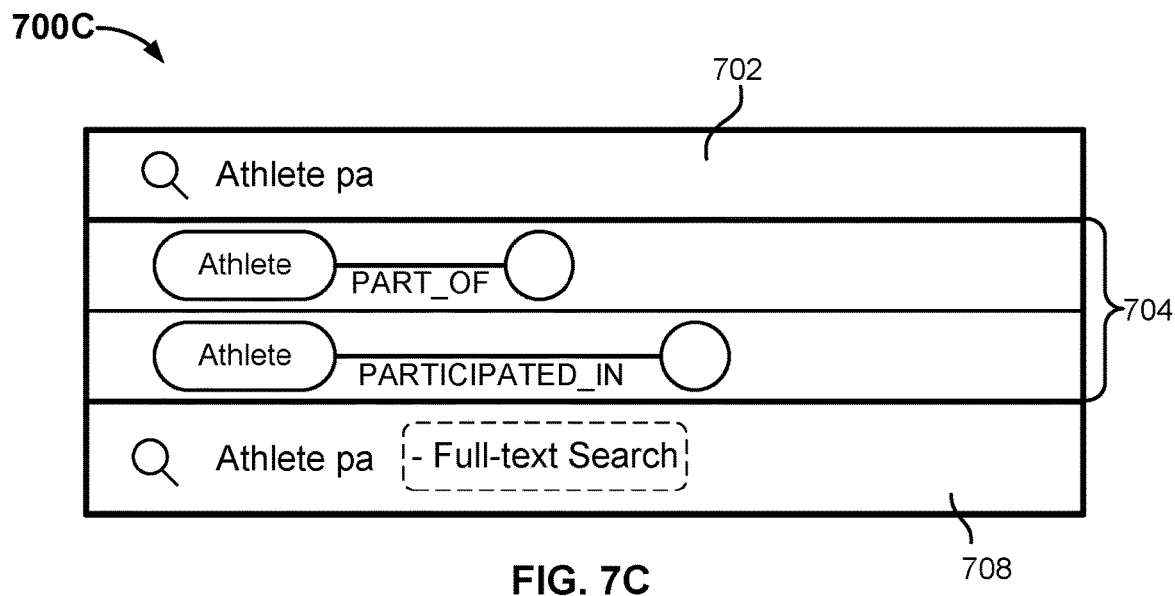
FIG. 7C is a diagram illustrating an example of an interactive user interface provided by an embodiment of a system to provide guided natural language interactions with a connected data system.

FIG. 7C is a diagram illustrating an example of an interactive user interface provided by an embodiment of a system to provide guided natural language interactions with a connected data system. In the example/state 700C shown, following on from selecting the Athlete category node 706, the user explores further by starting to enter the text part of in search box 702. By the time the user has entered pa the user interface 700C has stem-matched that partial text against the underlying graph structure and responded with two prompts for PART_OF and PARTICIPATED_IN relationships which it has found in the graph data, as shown in the results 704.

Figure 7D:
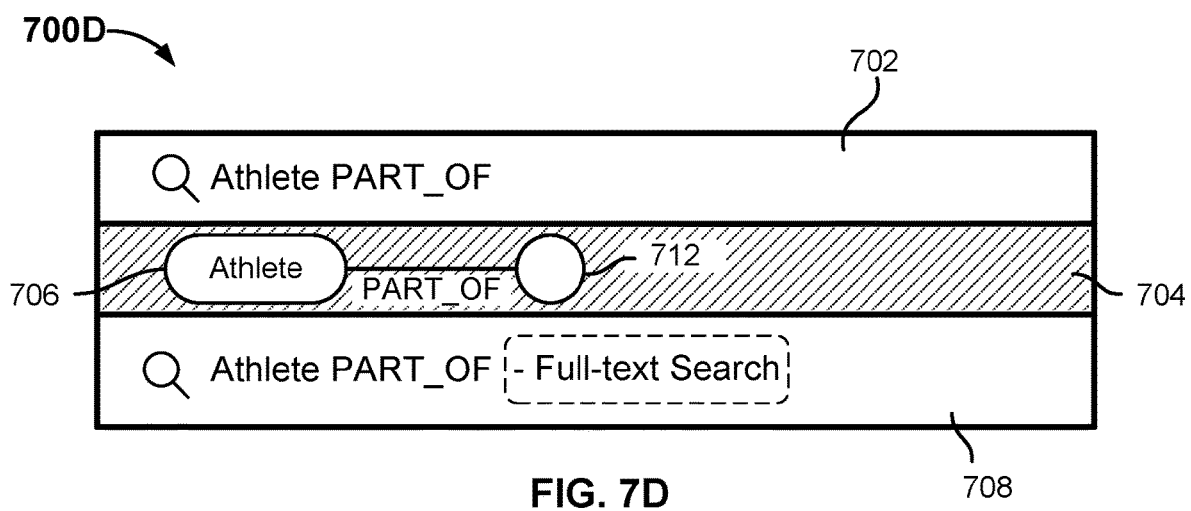
FIG. 7D is a diagram illustrating an example of an interactive user interface provided by an embodiment of a system to provide guided natural language interactions with a connected data system.

FIG. 7D is a diagram illustrating an example of an interactive user interface provided by an embodiment of a system to provide guided natural language interactions with a connected data system. In the example/state 700D shown, the user has selected the PART_OF relationship from FIG. 7C and that becomes part of the search pattern Athlete PART_OF in search box 702 with a corresponding visual cue in results 704, i.e., elimination of other options and highlighting with a fill color or pattern the user-selected path pattern Athlete PART_OF, with the destination of the relationship represented by the placeholder or wildcard node 712.

Figure 7E:
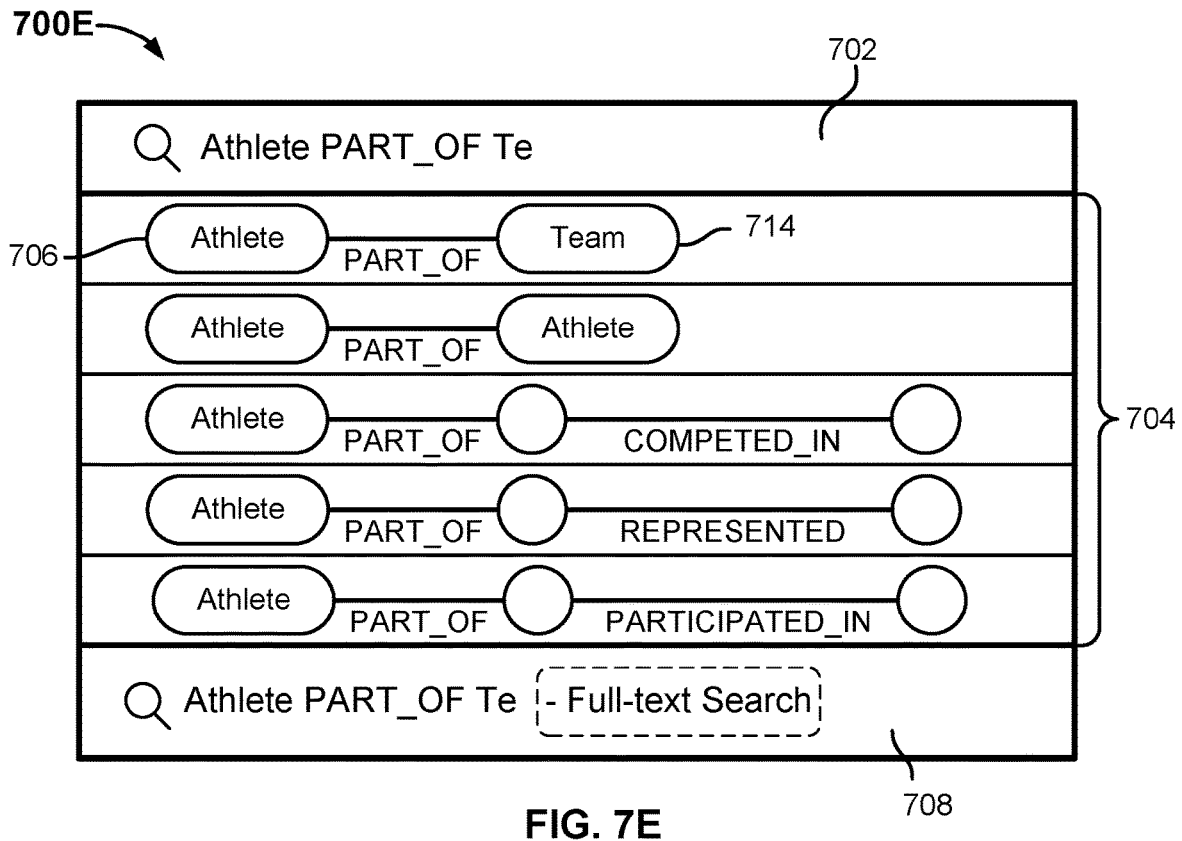
FIG. 7E is a diagram illustrating an example of an interactive user interface provided by an embodiment of a system to provide guided natural language interactions with a connected data system.

FIG. 7E is a diagram illustrating an example of an interactive user interface provided by an embodiment of a system to provide guided natural language interactions with a connected data system. In the example/state 700E shown, the user has proceeded to extend the sentence to Athlete PART_OF Team. The invention stem-matches T e entered by the user in search box 702, at the end of the structure Athlete PART_OF, and visually suggests the Team category node 714 as well as other more expansive graph patterns whose paths proceed further past the T e am nodes, as shown in results 704.

Figure 7F:
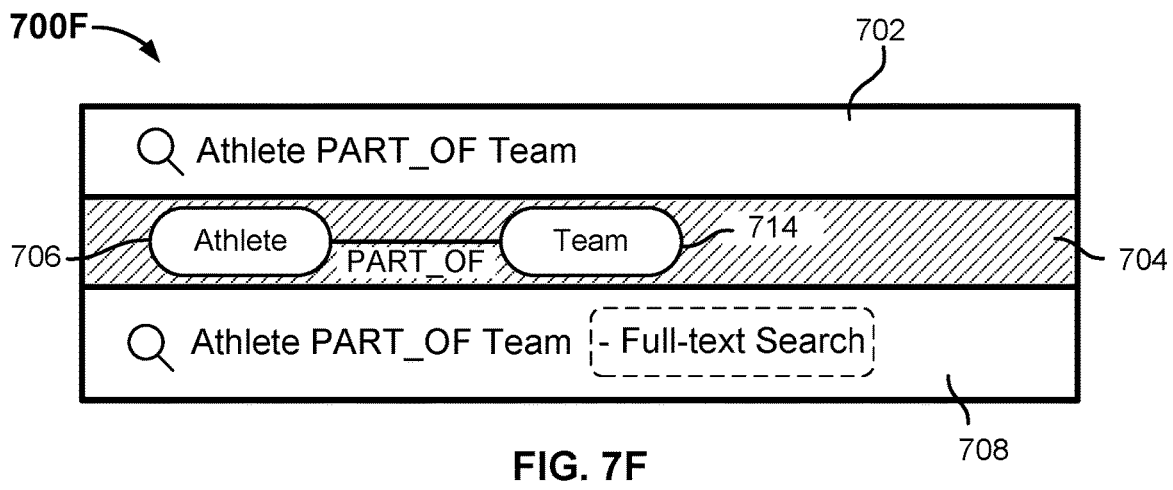
FIG. 7F is a diagram illustrating an example of an interactive user interface provided by an embodiment of a system to provide guided natural language interactions with a connected data system.

FIG. 7F is a diagram illustrating an example of an interactive user interface provided by an embodiment of a system to provide guided natural language interactions with a connected data system. In the example/state 700F shown, the user has selected the Team category node 714, which is added in the search box 702 and as a visual clue in the results 704 underneath.

Figure 7G:
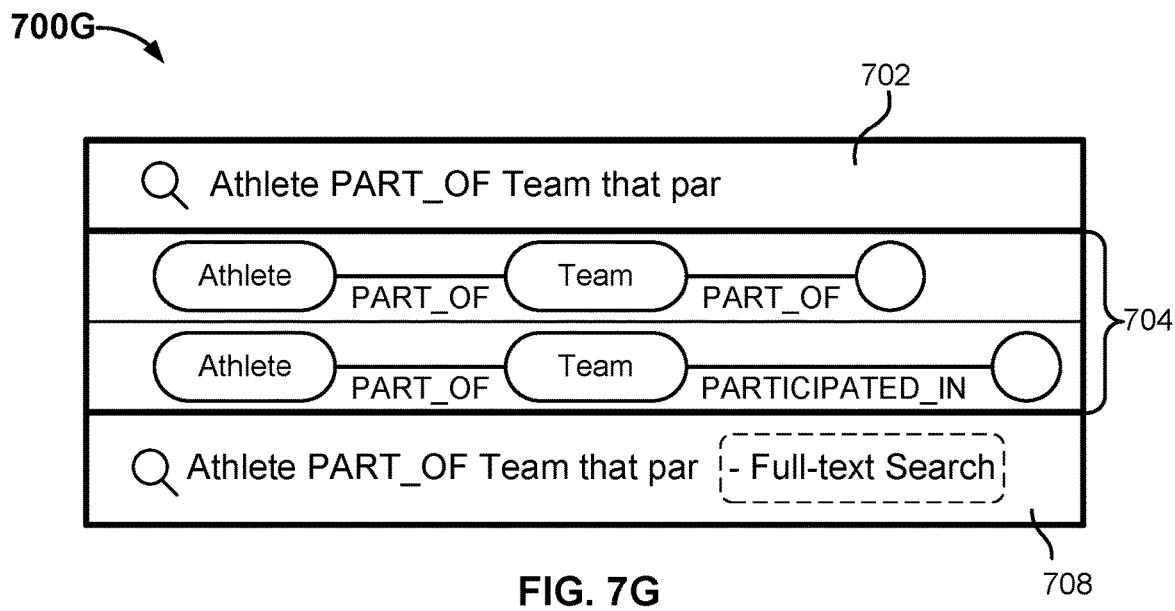
FIG. 7G is a diagram illustrating an example of an interactive user interface provided by an embodiment of a system to provide guided natural language interactions with a connected data system.

FIG. 7G is a diagram illustrating an example of an interactive user interface provided by an embodiment of a system to provide guided natural language interactions with a connected data system. In the example/state 700G shown, the user has further elaborated the user's query by extending the Athlete PART_OF Team expression with some more natural language text that par entered in search box 702. The spacer word that is detected and dropped by the system, and the text par is stem matched against relationships that exist in the graph structure, visually yielding PART_OF and PARTICIPATED_IN as possible next steps in the path search pattern as shown in results 704.

Figure 7H:
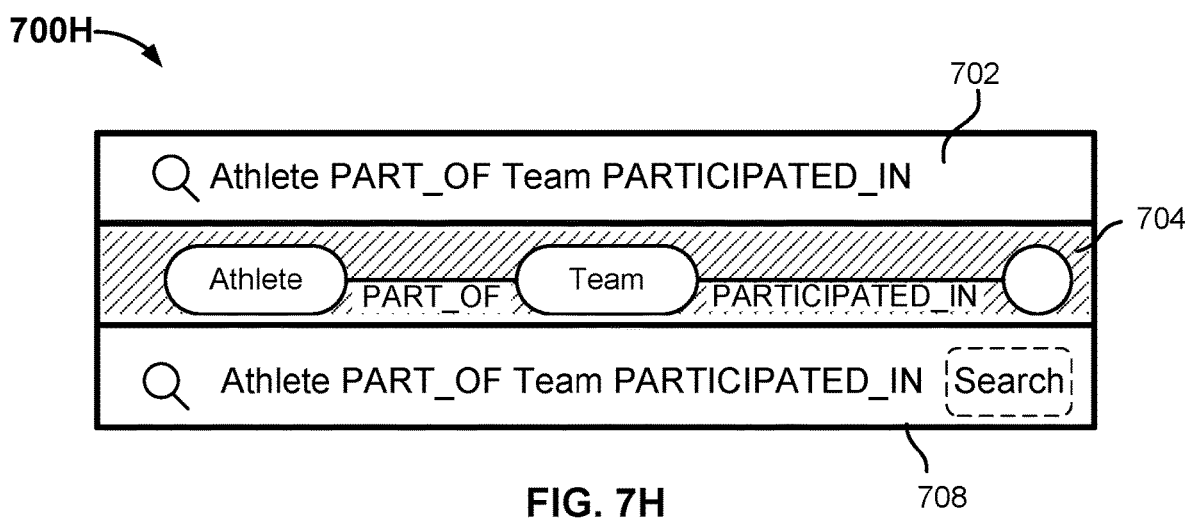
FIG. 7H is a diagram illustrating an example of an interactive user interface provided by an embodiment of a system to provide guided natural language interactions with a connected data system.

FIG. 7H is a diagram illustrating an example of an interactive user interface provided by an embodiment of a system to provide guided natural language interactions with a connected data system. In the example/state 700H shown, the user has selected PARTICIPATED_IN as the next term in the search text. This is confirmed by autocompleting associated text in the search box 702 and full text search box 708 and visually as shown in results 704.

Figure 7I:
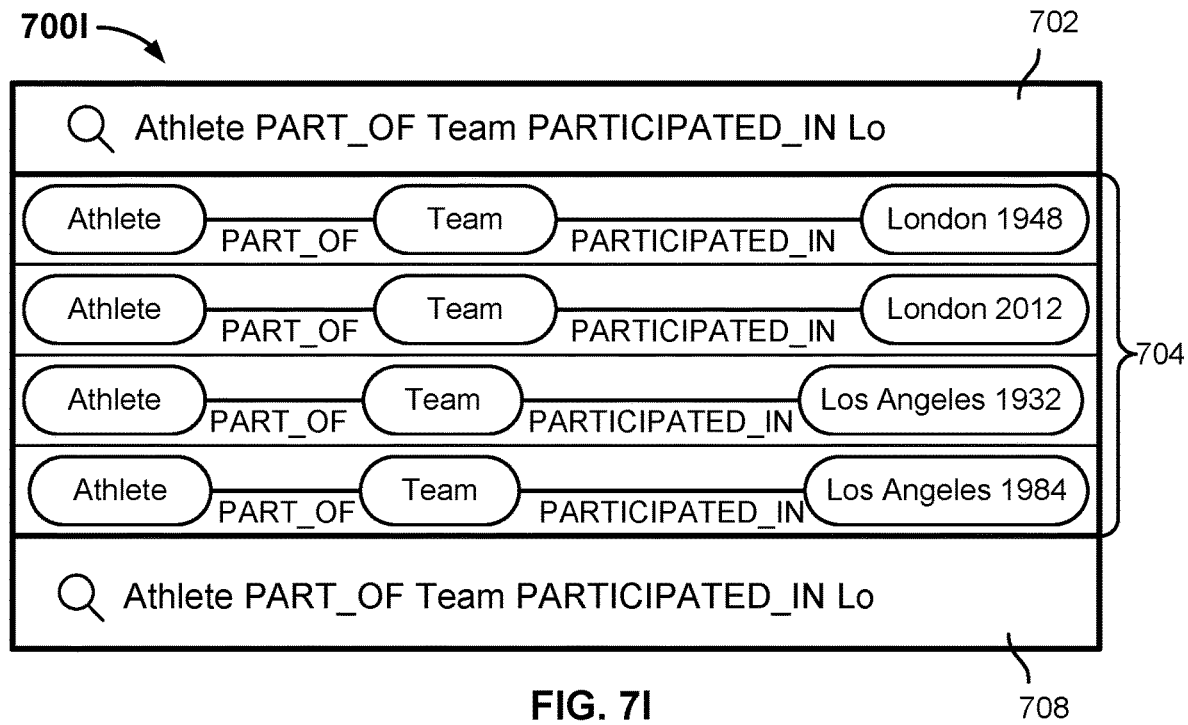
FIG. 7I is a diagram illustrating an example of an interactive user interface provided by an embodiment of a system to provide guided natural language interactions with a connected data system.

FIG. 7I is a diagram illustrating an example of an interactive user interface provided by an embodiment of a system to provide guided natural language interactions with a connected data system. In the example/state 700I shown, the user has again extended the search query by typing Lo at the head of the search pattern Athlete PART_OF Team PARTICIPATED_IN in search box 702. In the example shown, the added text Lo has been index-matched or otherwise mapped to entities in the graph, if any, that exist in the data and include the entered text Lo along a path that includes Athlete PART_OF Team PARTICIPATED_IN. In this example, the user is guided with matching nodes including Los Angeles and London in the respective years shown. The London 1948 node is then selected in this example, resulting in the user interface 700J of FIG. 7J being displayed.

Figure 7J:
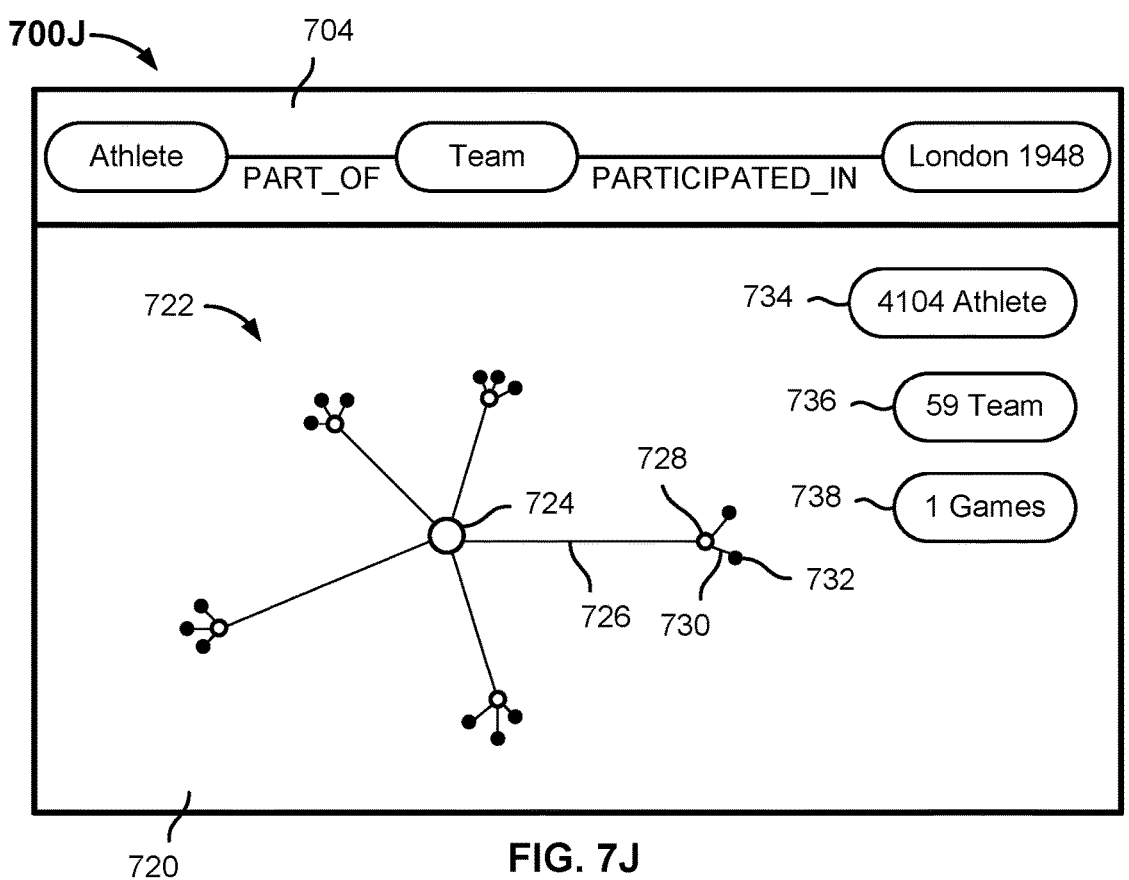
FIG. 7J is a diagram illustrating an example of an interactive user interface provided by an embodiment of a system to provide guided natural language interactions with a connected data system.

FIG. 7J is a diagram illustrating an example of an interactive user interface provided by an embodiment of a system to provide guided natural language interactions with a connected data system. In the example/state 700J shown, the full data set for those athletes who were in a team which participated in the London 1948 Olympics is presented in display area 720 as a connected subgraph 722. At this point the user has not had to explicitly enter any technical query language, but has through guided search, been able to implicitly provide such context to the underlying database to reach the desired informational goal.

In the example shown, the "Games" node "London 1948" is represented by the center node 724. The lines radiating out from center node 724 each represent a "participated in" relationship to a team node, such as relationship 726 to team node 728. Each team node in turn has one or more "part of" relationships with one or more athletes, such as "part of" relationship 730 to athlete 732.

In this example, categories 734, 736, and 738 are displayed, each including a corresponding count of instances represented in the results data set displayed in display area 720.

In various embodiments, user interface 700J enables the user to select any node(s) of interest and explore in a point and click fashion. In some embodiments, the user can select graph elements to provide starting points for further visually guided searches of the data.

A method and apparatus for searching a graph database using natural language has been disclosed. In various embodiments, a combination of stem-matching, fuzzy matching of user input mapped against the structure of the graph stored in the underlying graph database is used to convert natural language into equivalent executable graph database queries.

In various embodiments, a system as disclosed allows for the construction of correct, accurate graph database queries for non-expert users. In various embodiments, at each step in the input, the system matches the input using the state of the underlying graph to suggest next steps to the user. Beneath the user search, the system builds queries that are executed against the graph database.

In various embodiments, the system takes natural language queries from the user and establishes context for them from the underlying graph database. The context is enriched and improved as the user further interacts with the system, such that sophisticated graph queries can be built from natural language whose construction has been guided without technical intervention from experts.

In various embodiments, techniques disclosed herein may be used to enable non-technical users, who may be domain experts who know a lot about the data in a graph database but not the technical details of how to query such a database, to achieve the same information goals as a technical user armed with a full graph query language.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a memory configured to store a graph data set;
 a display device configured to display a displayed user interface configured to receive natural language input associated with a graph database query associated with the graph data set, the natural language input including at least one string comprising a partially-entered word entered by a user in a query input field comprising the displayed user interface; and
 a processor coupled to the memory and the display device interface and configured to:
 process the natural language input to generate a set of candidate strings;
 programmatically map at least a subset of the candidate strings to an entity in the graph data set;
 use the entity and data comprising the graph data set to determine a candidate graph pattern to be included in the graph database query, including by inserting into the candidate graph pattern additional node patterns or relationship patterns from the graph data set when the natural language input does not conform to the structure of the candidate path pattern;
sort the candidate graph pattern in a ranked order; and
use the candidate graph pattern to guide the user associated with the natural language input to refine the graph database query at least in part by displaying to the user a graph representation of the candidate graph pattern in the ranked order via a displayed user interface element selectable by the user to select the candidate graph pattern;
wherein the candidate graph pattern comprises a partially formed query represented at least in part as a punctuation-less path pattern including the plain text labels of a pattern that includes the entity in the graph data set, the pattern being expressed without graph query language punctuation; and
wherein the processor is further configured to maintain a bilateral mapping between the candidate graph pattern as represented by the punctuation-less path pattern and a corresponding representation of the candidate graph pattern expressed with graph query language punctuation, the corresponding representation of the candidate graph pattern expressed with graph query language punctuation being usable by a graph database system to perform a query with which the candidate graph pattern is associated.

2. The system of claim 1, wherein the natural language input is received via a network communication from a remote client system with which the graph database query is associated.

3. The system of claim 1, wherein processing the natural language input includes one or more of stemming, grouping, stop word elimination, spelling correction, and term expansion.

4. The system of claim 1, wherein the processor is configured map at least a subset of the candidate strings to the entity in the graph data set at least in part by using an index to locate one or more entities having a label or attribute value that matches a string in the at least a subset of the candidate strings.

5. The system of claim 1, wherein the processor is configured map at least a subset of the candidate strings to an entity in the graph data set at least in part by stemming a label or attribute value in the graph data and matching the stem to a string in the at least a subset of the candidate strings.

6. The system of claim 1, wherein the processor is configured to use the entity and data comprising the graph data set to determine a candidate graph pattern associated with the graph database query at least in part by using the entity as a starting point and exploring paths that exist in the graph database and which include the starting point.

7. The system of claim 6, wherein the entity comprises a first entity and the processor is further configured to determine the candidate graph pattern at least in part by mapping a next part of the natural language input to a value associated with one or both of a relationship and a node comprising the candidate graph pattern.

8. The system of claim 1, wherein the punctuation-less path pattern representation of the candidate graph pattern that includes text corresponding to one or both of entities and relationships in the graph database but omits at least a part of punctuation characters associated with a corresponding graph database query language representation of the candidate graph pattern.

9. The system of claim 1, wherein using the candidate graph pattern to guide the user associated with the natural language input to refine the graph database query includes displaying a graphical representation of the candidate graph pattern to the user via an interactive interface that enables the user to select the graphical representation of the candidate graph pattern to indicate the candidate graph pattern corresponds to the user's intent.

10. A method, comprising:
storing a graph data set in a memory;
receiving via a displayed user interface natural language input associated with a graph database query associated with the graph data set, the natural language input including at least one string comprising a partially-entered word entered by a user in a query input field comprising the displayed user interface;
processing the natural language input to generate a set of candidate strings;
programmatically mapping at least a subset of the candidate strings to an entity in the graph data set;
using the entity and data comprising the graph data set to determine a candidate graph pattern to be included in the graph database query, including by inserting into the candidate graph pattern additional node patterns or relationship patterns from the graph data set when the natural language input does not conform to the structure of the candidate path pattern;
sorting the candidate graph pattern in a ranked order; and
using the candidate graph pattern to guide a user associated with the natural language input to refine the graph database query at least in part by displaying to the user a graph representation of the candidate graph pattern in the ranked order via a displayed user interface element selectable by the user to select the candidate graph pattern;
wherein the candidate graph pattern comprises a partially formed query represented at least in part as a punctuation-less path pattern including the plain text labels of a pattern that includes an entity in the graph data set, the pattern being expressed without graph query language punctuation; and
further comprising maintaining a bilateral mapping between the candidate graph pattern as represented by the punctuation-less path pattern and a corresponding representation of the candidate graph pattern expressed with graph query language punctuation, the corresponding representation of the candidate graph pattern expressed with graph query language punctuation being usable by a graph database system to perform a query with which the candidate graph pattern is associated.

11. The method of claim 10, wherein processing the natural language input includes one or more of stemming, grouping, stop word elimination, spelling correction, and term expansion.

12. The method of claim 10, wherein the at least a subset of the candidate strings is mapped to the entity in the graph data set at least in part by using an index to locate one or more entities having a label or attribute value that matches a string in the at least a subset of the candidate strings.

13. The method of claim 10, wherein the at least a subset of the candidate strings is mapped to the entity in the graph data set at least in part by stemming a label or attribute value in the graph data and matching the stem to a string in the at least a subset of the candidate strings.

14. The method of claim 10, wherein using the entity and data comprising the graph data set to determine a candidate graph pattern associated with the graph database query includes using the entity as a starting point and exploring paths that exist in the graph database and which include the starting point.

15. The method of claim 14, wherein the entity comprises a first entity and the candidate graph pattern is determined at least in part by mapping a next part of the natural language input to a value associated with one or both of a relationship and a node comprising the candidate graph pattern.

16. A method, comprising:
   storing a graph data set in a memory;
   receiving via a displayed user interface natural language input associated with a graph database query associated with the graph data set, the natural language input including at least one string comprising a partially-entered word entered by a user in a query input field comprising the displayed user interface;
   processing the natural language input to generate a set of candidate strings;
   programmatically mapping at least a subset of the candidate strings to an entity in the graph data set;
   using the entity and data comprising the graph data set to determine a candidate graph pattern to be included in the graph database query, including by inserting into the candidate graph pattern additional node patterns or relationship patterns from the graph data set when the natural language input does not conform to the structure of the candidate path pattern;
   sorting the candidate graph pattern in a ranked order; and
   using the candidate graph pattern to guide a user associated with the natural language input to refine the graph database query at least in part by displaying to the user a graph representation of the candidate graph pattern in the ranked order via a displayed user interface element selectable by the user to select the candidate graph pattern;
   wherein the candidate graph pattern comprises a partially formed query represented at least in part as a punctuation-less path pattern including the plain text labels of a pattern that includes an entity in the graph data set, the pattern being expressed without graph query language punctuation; and
   further comprising maintaining a bilateral mapping between the candidate graph pattern as represented by the punctuation-less path pattern and a corresponding representation of the candidate graph pattern expressed with graph query language punctuation, the corresponding representation of the candidate graph pattern expressed with graph query language punctuation being usable by a graph database system to perform a query with which the candidate graph pattern is associated.

17. The computer program product of claim 16, wherein processing the natural language input includes one or more of stemming, grouping, stop word elimination, spelling correction, and term expansion.

18. The computer program product of claim 16, wherein the at least a subset of the candidate strings is mapped to the entity in the graph data set at least in part by using an index to locate one or more entities having a label or attribute value that matches a string in the at least a subset of the candidate strings.

19. The computer program product of claim 16, wherein the at least a subset of the candidate strings is mapped to the entity in the graph data set at least in part by stemming a label or attribute value in the graph data and matching the stem to a string in the at least a subset of the candidate strings.

20. The computer program product of claim 16, wherein using the entity and data comprising the graph data set to determine a candidate graph pattern associated with the graph database query includes using the entity as a starting point and exploring paths that exist in the graph database and which include the starting point.

* * * * *